United States Patent [19]

Chuang et al.

[11] Patent Number: 5,286,779

[45] Date of Patent: * Feb. 15, 1994

[54] EMULSION POLYMERIZATION COMPOSITION

[75] Inventors: Jui-Chang Chuang, Wayne; Jenn S. Shih, Paramus, both of N.J.; Domingo I. Jon, New York, N.Y.; John C. Hornby, Washington Township, Bergen County, N.J.

[73] Assignee: ISP Investments Inc., Wilmington, Del.

[*] Notice: The portion of the term of this patent subsequent to Jul. 6, 2010 has been disclaimed.

[21] Appl. No.: 28,866

[22] Filed: Mar. 10, 1993

Related U.S. Application Data

[63] Continuation-in-part of Ser. No. 928,594, Aug. 18, 1992, Pat. No. 5,225,474.

[51] Int. Cl.$^5$ ................................................. C08F 2/16
[52] U.S. Cl. ..................................... 524/460; 524/458
[58] Field of Search .................................. 524/466, 456

[56] References Cited

U.S. PATENT DOCUMENTS 5,225,474  7/1993  Jon et al. ................................. 524/460

Primary Examiner—Joseph L. Schofer
Assistant Examiner—Jeffrey T. Smith
Attorney, Agent, or Firm—Walter Katz; Marilyn J. Maue; Joshua J. Ward

[57] ABSTRACT

An emulsion polymerization composition comprises: (a) 1-45% by weight of an emulsion polymerizable monomer, (b) 0.1-5% by weight of an emulsifier and stabilizer which is a copolymer of a vinyl lactam and a polymerizable carboxylic acid, in a 99/1 to 1/99 weight ratio, (c) 1-10% of a surfactant based on monomer, preferably 2-6%, (d) 0.1-2%, preferably 0.2-1%, by weight of a polymerization initiator, and (e) the rest being water, in the form of an aqueous dispersion.

5 Claims, No Drawings

EMULSION POLYMERIZATION COMPOSITION

CROSS-REFERENCE TO RELATED PATENT APPLICATIONS

This application is a continuation-in-part of copending U.S. patent application Ser. No. 928,594, now U.S. Pat. No. 5,225,474 filed Aug. 18, 1992, and assigned to the same assignee as herein.

BACKGROUND OF THE INVENTION

This invention relates to emulsion polymerization, and, more particularly, to an emulsion polymerization monomer composition which includes a copolymer of a vinyl lactam and a polymerizable carboxylic acid as emulsifier and stabilizer, which composition is capable of providing latexes having a high solids content, little or no coagulum or residue therein, and a high viscosity.

SUMMARY OF THE INVENTION

An emulsion polymerization composition is provided herein which comprises: (a) 1–45% by weight of an emulsion polymerizable monomer, (b) 0.1–5% by weight of an emulsifier and stabilizer which is a copolymer of a vinyl lactam and a polymerizable carboxylic acid, in a 99/1 to 1/99 weight ratio, (c) 1–10% of a surfactant based on monomer, preferably 2–6%, (d) 0.1–2%, preferably 0.2–1%, by weight of a polymerization initiator, and (e) the rest being water, in the form of an aqueous dispersion.

The composition provides latexes having small particle sizes, in high yield, with little or no coagulum or residual monomer therein, upon polymerization of the composition at 80°–82° C., for at least 0.5 hour, the product having at least 30% solids, preferably 45–55%, and a Brookfield viscosity of at least 600 cps, preferably 1600 cps or more.

DETAILED DESCRIPTION OF THE INVENTION

The emulsifier and stabilizer copolymer used in the emulsion polymerization composition of the invention comprises a vinyl lactam and a polymerizable carboxylic acid. This copolymer may be made by precipitation polymerization of the monomers in an aliphatic hydrocarbon solvent in the presence of a polymerization initiator.

Suitable vinyl lactams for use herein include vinyl pyrrolidone, vinyl caprolactam and alkylated vinyl derivatives thereof. Suitable polymerizable carboxylic acids include e.g. acrylic acid (AA), methacrylic acid (MAA), itaconic acid and its monoesters, maleic acid and its monoesters, and crotonic acid. Acrylic acid or methacrylic acid is a preferred comonomer in the polymerization. These monomers may be employed in weight ratios over the entire compositional range of the copolymers, i.e. from 1–99 weight percent vinyl lactam and 99–1 weight percent of a polymerizable carboxylic acid such as acrylic acid. Accordingly, weight ratios of VP:AA in the copolymer of 99:1, 75:25, 50:50, 25:75 and 1:99, for example, may be conveniently prepared for use in this invention in substantially quantitative yields.

The reaction solvent of the invention suitably is a $C_3$–$C_{10}$ saturated hydrocarbon which is linear, branched, cyclic or acyclic. Preferably the solvent is a $C_5$–$C_8$ aliphatic hydrocarbon or mixtures thereof.

Preferred aliphatic hydrocarbon solvents are heptane and cyclohexane. Heptane, the most preferred solvent, provides high yields of a precipitate of the desired copolymer as a fine white powder which is easy to filter and dry.

The amount of solvent used to prepare such copolymers should be sufficient to dissolve an appreciable amount of the reactants and to maintain the copolymer precipitate in a stirrable state at the end of the polymerization. Generally, up to about 40% solids, preferably 15–20% solids, is maintained in the reaction mixture.

The precipitation polymerization process is carried out in the presence of a polymerization initiator, preferably a free radical initiator, and most suitably, a peroxy ester, e.g. t-butylperoxy pivalate, although other free radical initiators such as acyl peroxides and alkyl peroxides may be used as well. The amount of such initiator may vary widely; generally about 0.2–5.0% is used, based on the weight of total monomers charged.

The reaction temperature of the precipitation polymerization may vary widely; generally the reactants are maintained at about 50°–150° C., preferably 60°–70° C., during the polymerization. Pressure usually is kept at atmospheric pressure, although higher and lower pressures may be used as well.

The reaction mixture also should be stirred vigorously under an inert atmosphere, e.g. nitrogen, during the polymerization. A stirring rate of about 400–600 rpm in a 1-liter laboratory reactor is quite adequate to effect the desired polymerization and to keep the precipitate in a stirrable state during the polymerization.

The monomers and initiator used in such process are commercially available materials, as described below.

|  | Source | Form |
|---|---|---|
| Monomers |  |  |
| Vinyl pyrrolidone | ISP | Liquid |
| or |  |  |
| Vinyl caprolactam | Aldrich | Solid |
| Acrylic acid | Rohm and Haas | Liquid |
| or |  |  |
| Methacrylic acid | Aldrich | Liquid |
| Initiator |  |  |
| t-Butylperoxy pivalate | ATOCHEM NA (Lupersol ® 11) | Liquid; 75% solution in mineral spirits |
| or |  |  |
| t-Amylperoxy pivalate | ATOCHEM NA (Lupersol ® 554) | Liquid; 75% solution in mineral spirits |

The precipitation polymerization process may be carried out by first precharging a suitable reactor with a predetermined amount of a vinyl lactam in the aliphatic hydrocarbon solvent, and heating the solution to a desired reaction temperature while stirring vigorously under an inert gas atmosphere. The initiator is then charged into the reactor. Then a selected amount of the polymerizable carboxylic acid, e.g. acrylic acid, is admitted into the reactor over a period of time, generally about an hour or more. Then the reaction mixture is held for an additional period of time for polymerization to occur. Finally, the mixture is cooled to room temperature. Filtering, washing with solvent, and drying provides the copolymer in yields approaching quantitative, and, substantially, in a composition predetermined by the weight ratio of monomers introduced into the reactor.

Alternatively, the aliphatic hydrocarbon solvent can be precharged into the reactor, purged with nitrogen, heated to reaction temperature, the initiator added, and then separate streams of the vinyl lactam monomer and the acrylic acid monomer are introduced over a period of time into the precharged reactor.

A typical run for preparing copolymers of vinyl pyrrolidone and acrylic acid (know as "Acrylidones") is described below.

A 1-liter, 4-necked reaction kettle was equipped with a mechanical stirrer, thermometer, dropping funnel and a nitrogen purge tube. The reactor was precharged with 75 g. of vinyl pyrrolidone in 500 g. of heptane. The solution then was heated to 65° C. during 20 minutes and held there for 30 min., while stirring under nitrogen gas. Then 260 microliter (0.3 g.) of t-butylperoxy pivalate initiator was added. Then 25 g. of acrylic acid was admitted during a period of 1 hour and the mixture was held for an hour. Then an additional 140 microliter (0.2 g.) of initiator was admitted into the reaction mixture and the solution was maintained at 65° C. with stirring for another 2 hours. Then another 100 microliter of initiator was added and the mixture held for 2 hours.

The reaction product then was cooled to room temperature during a period of about an hour. A fine white powder precipitate of copolymer product was obtained which was filtered, washed twice with heptane and dried overnight at 100° C. and then overnight again in a vacuum oven at 100° C. A 75:25 VP:AA copolymer (wt. ratio) was obtained in 97% yield. The product had a K-value of about 70 (1% copolymer in 0.1N NaOH and 0.2N $LiNO_3$ aqueous solution); the weight average molecular weight of the copolymer was about 200,000, as measured by light scattering in dimethylformamide solvent.

The procedure was followed using 99, 95, 50, 25 and 1 g. of vinyl pyrrolidone and 1.5, 50, 75 and 99 g. of acrylic acid, to produce the corresponding 99:1, 95:5, 50:50, 25:75 and 1:99 wt. ratio VP:AA copolymers.

Representative emulsion polymerizable monomers for use in the emulsion polymerization composition of the invention includes acrylic and methacrylic acid esters such as ethyl acrylate, methylacrylate, butyl methacrylate, etc.; acrylamide and alkyl-substituted acrylamides such as N,N-dibutylacrylamide, N-t-octylacrylamide, etc.; vinyl esters such as vinyl acetate, vinyl butyrate, etc.; dienes such as butadiene, isoprene, etc.; aromatic compounds such as styrene, vinyl toluene, etc.; vinyl halides such as vinyl chloride, vinylidene chloride, etc.; acid monomers such as acrylic acid, itaconic acid, etc.; acrylonitrile, methacrylonitrile and other commonly known monomers.

The emulsion polymerization process is carried out in the presence of a polymerization initiator and, optionally, a chain transfer agent. Representative initiators include: hydrogen peroxide, potassium persulfate, ammonium persulfate, etc., which are preferably employed with an activator such as an amine, meta-bisulfite, ascorbic acid or ferrous salt. Representative chain transfer agents or regulators are t-dodecyl mercaptan or N-octyl mercaptan.

Suitable emulsifying agents are non-ionic or anionic surfactants and a mixture of them is preferred. Examples of nonionic surfactants are condensation products of active hydrogen containing organic compounds with ethylene oxide (EO) such as nonylphenol with 9–100 EO. Examples of anionic surfactants are sulfonic acid esters, sulfate esters, phosphate esters, alkyl aryl sulfonic acids, and salts and mixtures thereof, such as sodium dodecyl benzene sulfonate, lauryl sulfate, etc.

The emulsion polymerization composition is prepared using water as the dispersion medium to provide an aqueous dispersion of the emulsion polymerizable monomer, or monomers, the emulsifier and stabilizer component, the surfactant, and the polymerization initiator, in predetermined percentage ranges of each.

The invention will now be described with reference to the following examples.

EXAMPLE 1

An emulsion polymerization composition was made from the following components:

(a) 218.15 g. of vinyl acetate and 38.5 g. of butyl acrylate,
(b) 1.25 g. of 75/25 by weight of a copolymer of vinyl pyrrolidone and acrylic acid (ISP - Acrylidone ACP-1001),
(c) 13.25 g. of Igepal® CO-990 and 1.5 g. of Igepal® CO-730 (Rhone-Poulenc),
(d) 0.9 g. of sodium persulfate, and
(e) 212.9 g. of water.

The reaction mixture was prepared by mixing components (b), (c) and (e) and 1.0 g. of sodium bicarbonate, and heating to a polymerization temperature of 65° C.; then (d) was added, followed by slow addition of (a) over 2 hours, and heat at 75° C. for 0.5 hour. Add 0.50 g. of t-butyl hydroperoxide (10% active) and 25 g. of sodium formaldehyde sulfoxylate (20% active) over a period of 1 hour. At the conclusion of polymerization, a small particle size latex was formed, with little monomer residue. The % solids obtained was 52.7%. The product had a Brookfield viscosity, 12 rpm, Spindle #3, of 1600 cps. was stable for at least 3 freeze-thaw cycles with no separation of particle. No residue coagulum was observed.

EXAMPLES 2–3 AND CONTROLS 1 AND 2

In Examples 2 and 3, the procedure of Example 1 was followed with various amounts of Acrylidones; Control 1 was performed without Acrylidone, and Control 2 with surfactant but without Acrylidone.

The results in the Table show that both Acrylidone and surfactant are necessary for production of latexes at high solids content, of high viscosity, and without residue or coagulation.

TABLE

| Example | VP/AA (%) | Surfactant (%)* | VA/BA (%) | % Solids | Product | Brookfield Viscosity, cps. |
|---|---|---|---|---|---|---|
| Control-1 | — | 5.6 | 45/8 | 54.8 | Heavy Residue | 1150 |
| Control-2 | — | — | 45/8 | — | Polymer Coagulant | — |
| 1 | 0.25 | 5.6 | 45/8 | 52.7 | No residue | 1600 |
| 2 | 0.12 | 5.6 | 45/8 | 54.0 | No residue | 600 |
| 3 | 0.06 | 5.6 | 45/8 | 52.4 | Residue | 500 |

What is claimed is:

1. An emulsion polymerization composition in the form of an aqueous dispersion for producing a latex of at least 30% solids having a Brookfield viscosity of at least 600 cps, and with substantially no coagulum or residue, comprising:
(a) about 30–65% by weight of the composition of an emulsion polymerizable monomer selected from styrene, butadiene, vinyl acetate, methyl acrylate, ethyl acrylate, butyl acrylate, vinyl chloride, acrylonitrile, and acrylamide and mixtures thereof, which may include one or more comonomers selected from acrylic acid, itaconic acid, fumaric acid, 2-hydroxyethyl acrylate and methacrylic acid;
(b) about 0.1–5% by weight of the composition of a copolymer of (i) a vinyl lactam and (ii) a polymerizable carboxylic acid, in a 99/1 to 1/99 weight ratio;
(c) about 1–10% by weight based on the monomer of a surfactant which is a non-ionic or anionic surfactant, or mixtures thereof, selected from condensation products of active hydrogen containing organic compounds with ethylene oxide, sulfonic acid esters, sulfate esters, phosphate esters, alkyl arylsulfonic acids, and salts thereof;
(d) about 0.1–2% by weight of the composition of a polymerization initiator; and
(e) the rest being water.

2. A composition according to claim 1 wherein (a) is about 45–60%; (b) is about 0.2–2%; and (c) is about 2–6%.

3. A composition according to claim 1 wherein (a) is 55%; (b) is about 0.25; and (c) is about 5.6%.

4. The latex product obtained by polymerizing the composition of claim 1.

5. The latex product of claim 4 having a solids content of 45–55% and a Brookfield viscosity of about 600–1500 cps.

* * * * *